Nov. 10, 1936.   H. D. GEYER   2,060,565
FLYWHEEL
Filed Sept. 15, 1933
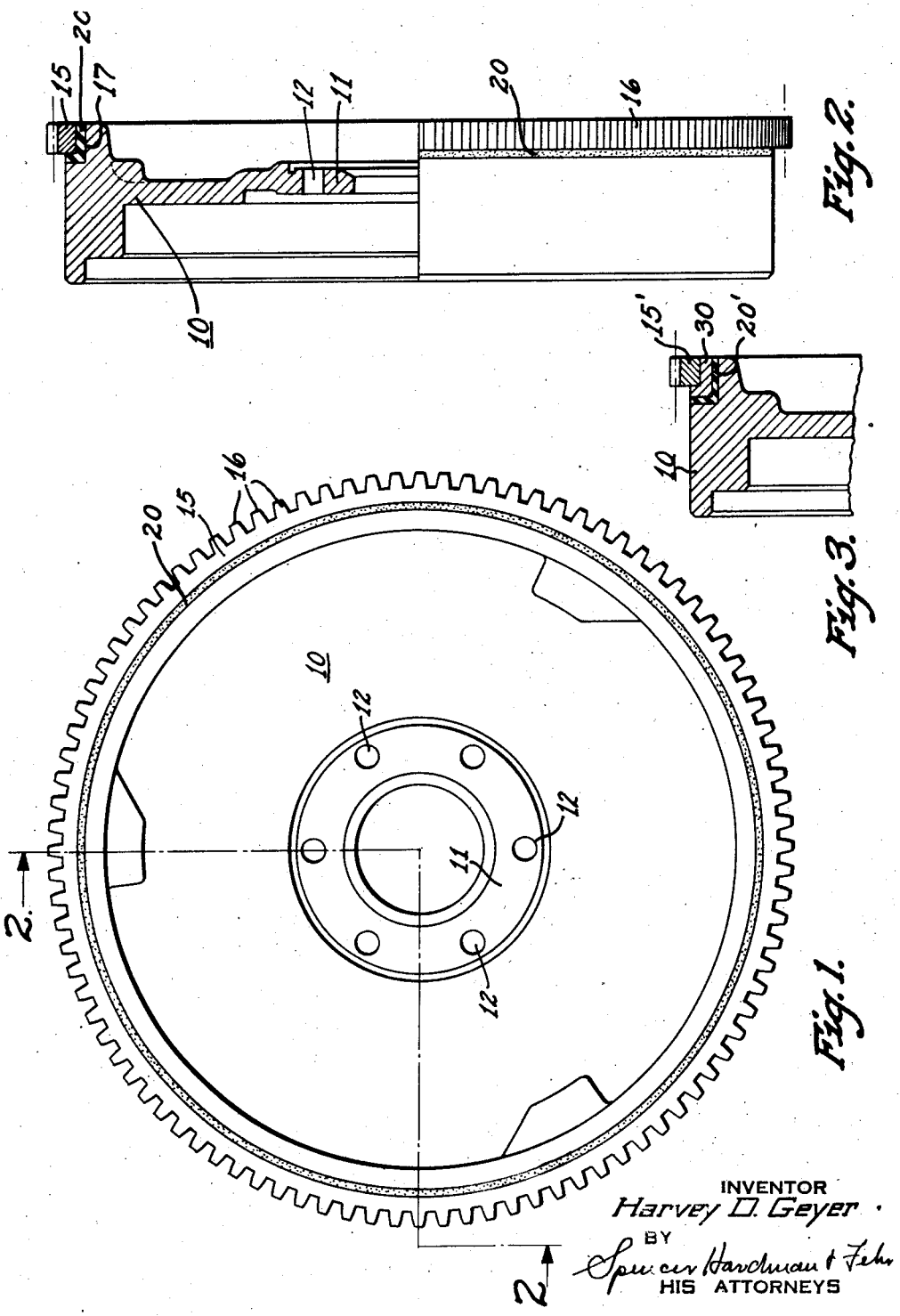
INVENTOR
Harvey D. Geyer
BY
Spencer Hardman & Fehr
HIS ATTORNEYS Patented Nov. 10, 1936

2,060,565

UNITED STATES PATENT OFFICE 2,060,565

FLYWHEEL

Harvey D. Geyer, Dayton, Ohio, assignor, by mesne assignments, to General Motors Corporation, Detroit, Mich., a corporation of Delaware Application September 15, 1933, Serial No. 689,639

3 Claims. (Cl. 74—574)

This invention relates to flywheels on internal combustion engines, particularly on present day automobile engines.

An object of the invention is to provide a flywheel having a separate ring gear mounted thereupon adjacent its outer periphery by means of an intervening resilient rubber cushion, which resiliently insulates the ring gear from the flywheel and thereby greatly reduces the transmission of sound and vibration from the starting motor pinion to the engine.

Another object is to provide simple means for dampening the torsional vibration in the automobile engine crank shaft.

Another object is to provide a simple and efficient resilient driving means between the ring gear and the relatively heavy engine flywheel whereby the initial engagement between the starting motor pinion and ring gear is facilitated.

Further objects and advantages of the present invention will be apparent from the following description, reference being had to the accompanying drawing, wherein a preferred embodiment of one form of the present invention is clearly shown.

In the drawing:

Fig. 1 is a front view of an automobile engine flywheel and ring gear mounted thereupon according to this invention.

Fig. 2 is a view taken on line 2—2 of Fig. 1.

Fig. 3 is similar to the upper portion of Fig. 2, but shows a modification.

Similar reference characters refer to similar parts throughout the several views.

Numeral 10 designates the main portion of the flywheel which is preferably a semi-steel casting, and has at its center an inner flange 11 with spaced bolt or rivet holes 12 for rigidly securing same to a small flange or collar on the automobile crank-shaft in a well-known manner.

The ring gear 15, made preferably of a high grade hardened steel, has the gear teeth 16 cut therein and finished prior to being secured to the flywheel 10.

The flywheel 10 has one corner of its outer periphery grooved or notched out as shown in section at 17 in Fig. 2 at the location where it is desired to attach the ring gear 15. The flywheel 10 and ring gear 15 are set and properly located within a rubber vulcanizing mold with a blank ring of uncured rubber of the desired rubber compound interposed between them, whereupon the resilient rubber ring 20 is vulcanized in situ and thereby firmly bonded to both the flywheel 10 and gear ring 15. Preferably the metal surfaces to which the rubber ring 20 is bonded is first brass plated in order to secure a stronger bond between the metal and rubber. The resilient rubber annulus 20 thus very strongly secures the ring gear 15 in its proper position but at the same time permits a small relative movement therebetween, whereby the sound vibrations set up by the engagement of the starting motor pinion with the gear teeth 16 are substantially dampened and prevented from being transmitted to the flywheel 10 from where it would reach all parts of the car. The rubber annulus 20 should be of sufficient thickness to permit the rubber to yield under torque a certain degree when a torque load is being transmitted through it from the ring gear 15 to the flywheel 10, or vice versa, and yet not so thick as to prevent the ring gear from being held in proper mesh with the starting motor pinion with which it engages. It has been found that this can be best accomplished by providing a relatively light ring gear 15 and securing it in place upon the flywheel with a relatively thin resilient rubber annulus 20 extending around at least two sides of the ring gear and mounted in a groove 17 upon the periphery of the flywheel. Fig. 2 clearly illustrates this form of the invention. When this is done the natural period of vibration of the ring gear 15 upon the flywheel 10 as a base is very short, or in other words the natural frequency of vibration of ring gear 15 is thus made so high that it will never coincide with or even approximate the frequency of the usually occurring torsional vibration of the crank shaft of engines in present day automobiles at any possible speed thereof. For this reason the resiliently mounted ring gear 15 can never act to reinforce and increase the torsional vibration of the engine crank shaft but will always have a higher natural frequency and hence will always serve to resist and dampen such torsional vibration of the crank shaft.

Fig. 3 shows a modified form of the invention wherein the ring gear 15' is rigidly fixed to the annular metal ring 30 which in turn is bonded by vulcanization in situ to the resilient rubber annulus 20' in the same manner as described above. In this form only the metal ring 30 may be properly located in the vulcanizing mold with the flywheel 10 and the resilient rubber annulus 20' bonded by vulcanization to both these parts. The finished ring gear 15' may then be press fitted upon the metal ring 30 or otherwise rigidly fixed thereto. In this method of assembling the ring gear 15' is not subjected to the heat of vulcanization and hence can not be warped by such heat. If the ring 38 happens to be warped slightly during such vulcanization it will be accurately reshaped when ring gear 15' is pressed thereupon.

While the form of embodiment of the present invention as herein disclosed, constitutes a preferred form, it is to be understood that other forms might be adopted, all coming within the scope of the claims which follow.

What is claimed is as follows:

1. In combination, an automobile engine having a flywheel, a relatively light weight radially resilient ring gear mounted adjacent the outer periphery of said flywheel, said ring gear being insulated from the flywheel by an intervening radially uncompressed resilient rubber cushion, bonded by vulcanization to both said ring gear and flywheel.

2. In combination, an automobile engine having a flywheel, a relatively light weight radially resilient ring gear mounted adjacent the outer periphery of said flywheel, said ring gear being insulated from the flywheel by an intervening radially uncompressed resilient rubber cushion, said resilient rubber cushion being in the form of an annular ring vulcanized in situ to both said ring gear and flywheel and adapted to yield by internal distortion thereof in all directions.

3. In combination, an automobile engine having a flywheel, a relatively light weight radially resilient metal ring gear mounted adjacent the outer periphery of said flywheel, said ring being secured in place thereupon by an intervening resilient rubber annulus surface-bonded by vulcanization to said ring gear and flywheel and being under no radial compression, whereby said light weight ring gear will yield more readily in a radial direction.

HARVEY D. GEYER.